(12) United States Patent
Kitahama et al.

(10) Patent No.: US 8,983,679 B2
(45) Date of Patent: Mar. 17, 2015

(54) MOVEMENT TRAJECTORY GENERATOR

(75) Inventors: Kenichi Kitahama, Yokohama (JP);
Shinya Kawamata, Gotenba (JP);
Toshiyuki Matsubara, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 414 days.

(21) Appl. No.: 13/203,543

(22) PCT Filed: Feb. 26, 2010

(86) PCT No.: PCT/JP2010/053097
§ 371 (c)(1),
(2), (4) Date: Oct. 3, 2011

(87) PCT Pub. No.: WO2010/098449
PCT Pub. Date: Sep. 2, 2010

(65) Prior Publication Data
US 2012/0022716 A1    Jan. 26, 2012

(30) Foreign Application Priority Data
Feb. 27, 2009    (JP) ............... P2009-046056

(51) Int. Cl.
     *G05D 1/00*          (2006.01)
     *G05D 3/00*          (2006.01)
     (Continued)

(52) U.S. Cl.
     CPC ............ *G01C 21/34* (2013.01); *G01C 21/3685* (2013.01); *G08G 1/16* (2013.01); *G08G 1/166* (2013.01)
     USPC ........ 701/1; 701/23; 701/25; 701/26; 701/27; 701/28

(58) Field of Classification Search
     USPC ............... 701/1, 23, 25, 26, 27, 28, 538, 514; 180/167, 169
     See application file for complete search history.

(56) References Cited

U.S. PATENT DOCUMENTS 5,870,303 A * 2/1999 Trovato et al. .................. 700/61
5,956,250 A * 9/1999 Gudat et al. ..................... 701/26
(Continued)

FOREIGN PATENT DOCUMENTS

JP      05-093630 A      4/1993
JP      2000-227999 A      8/2000
(Continued)

OTHER PUBLICATIONS

International Preliminary Report on Patentability (Chapter I of the Patent Cooperation Treaty), dated Sep. 22, 2011 (7 pages).

*Primary Examiner* — Nicholas Kiswanto
(74) *Attorney, Agent, or Firm* — Gifford, Krass, Sprinkle, Anderson & Citkowski, P.C.

(57) ABSTRACT

A movement trajectory generator 1 that generates a movement trajectory of a vehicle is provided, which includes traveling environment recognition means 10, 11, and 21 for recognizing a traveling environment, movement strategy generation means 22 for generating movement strategies for positioning in a road area according to the traveling environment that is recognized by the traveling environment recognition means, presenting means 12, 23, and 27 for presenting a passenger setting information of the movement strategies, setting means 12 and 28 for receiving an operation for the passenger to set the movement strategies based on the setting information of the movement strategies presented by the presenting means, and movement trajectory generation means 29 for generating the movement trajectory based on the movement strategies set by the setting means.

13 Claims, 10 Drawing Sheets

(51) Int. Cl.
*G06F 7/00* (2006.01)
*G06F 17/00* (2006.01)
*G01C 22/00* (2006.01)
*G01C 21/34* (2006.01)
*G01C 21/36* (2006.01)
*G08G 1/16* (2006.01)

(56) References Cited

U.S. PATENT DOCUMENTS

| | | | | |
|---|---|---|---|---|
| 5,987,364 | A * | 11/1999 | Le Gusquet et al. | 701/24 |
| 6,445,983 | B1 * | 9/2002 | Dickson et al. | 701/23 |
| 6,564,123 | B2 * | 5/2003 | Hahn et al. | 701/1 |
| 6,708,085 | B2 * | 3/2004 | Yamane et al. | 701/1 |
| 6,906,639 | B2 * | 6/2005 | Lemelson et al. | 340/903 |
| 6,940,426 | B1 * | 9/2005 | Vaida | 340/963 |
| 7,088,262 | B2 * | 8/2006 | Schindler et al. | 340/932.2 |
| 7,949,469 | B2 * | 5/2011 | Hattori et al. | 701/301 |
| 8,050,863 | B2 * | 11/2011 | Trepagnier et al. | 701/514 |
| 8,056,667 | B2 * | 11/2011 | Moshchuk et al. | 180/169 |
| 8,126,642 | B2 * | 2/2012 | Trepagnier et al. | 701/423 |
| 8,280,562 | B2 * | 10/2012 | Villaume et al. | 701/3 |

FOREIGN PATENT DOCUMENTS

| | | |
|---|---|---|
| JP | 2002-139329 A | 5/2002 |
| JP | 2004-086450 A | 3/2004 |
| JP | 2005-053373 A | 3/2005 |
| JP | 2007-272350 A | 10/2007 |
| JP | 2008-002854 A | 1/2008 |
| JP | 2008-269007 A | 11/2008 |
| JP | 2009-026321 A | 2/2009 |
| WO | WO-2006/064544 A1 | 6/2006 |

* cited by examiner

| RULE | VIOLATION COST |
|---|---|
| RULE 1 | 1.0 |
| RULE 2 | 0.2 |
| RULE 3 | 0.4 |
| ⋮ | ⋮ |
| RULE N | 0.8 |

(b)

| RULE 1 | ○ |
|---|---|
| RULE 3 | △ |

(c)

| RULE 1 | × |
|---|---|
| RULE N | × |

*Fig.8*

| | |
|---|---|
| CANDIDATE 1: NODE 1 | →NODE 7 |
| CANDIDATE 2: NODE 1 | →NODE 6 |
| CANDIDATE 3: NODE 1 | |
| CANDIDATE 4: NODE 1 →NODE 2 | |

Fig.9

| | | |
|---|---|---|
| CANDIDATE 1: NODE 1 | →NODE 7 | <DEGREE OF RISK 4> |
| CANDIDATE 2: NODE 1 →NODE 6 | | <DEGREE OF RISK 3> |
| CANDIDATE 3: NODE 1 | | <DEGREE OF RISK 0.5> |
| CANDIDATE 4: NODE 1 →NODE 2 | | <DEGREE OF RISK 1> |

(a)

(b)

MOVEMENT TRAJECTORY GENERATOR

CROSS-REFERENCE TO RELATED APPLICATIONS

This application is the U.S. National Phase of PCT/JP2010/053097 filed Feb. 26, 2010, which claims priority of Japanese Patent Application P2009-046056 filed Feb. 27, 2009.

TECHNICAL FIELD

The present invention relates to a movement trajectory generator that generates a movement trajectory of a vehicle.

BACKGROUND ART

A movement trajectory generator generates a movement trajectory that is used in automated driving on a system side. However, due to deterioration of recognition accuracy of the surrounding environment of a host vehicle, the generated movement trajectory may not be appropriate. In such a case, it is necessary for a passenger (particularly, a driver) to change the movement trajectory. An apparatus described in Patent Literature 1 displays a host vehicle, a parking space, and a movement path on a screen, and if a passenger changes the movement path that is displayed on the screen, it performs parking in a garage under automatic control along the movement path after the change.

CITATION LIST

Patent Literature

Patent Literature 1: International Patent Publication No. 2006/064544
Patent Literature 2: Japanese Unexamined Patent Application Publication No. 2005-53373
Patent Literature 3: Japanese Unexamined Patent Application Publication No. 2008-2854

SUMMARY OF INVENTION

Technical Problem

In the case of the above-described apparatus, when the passenger performs the change operation of the movement path of automated parking, the vehicle is typically in a stop state, and thus the passenger is in a situation where the passenger can comfortably perform confirmation of the surrounding environment or the change operation (static situation). Due to this, the passenger has sufficient time to perform the operation, and thus can change the movement path as desired. However, in the case where a vehicle is in a traveling state (including automated driving), the passenger is in a situation where it is difficult for the passenger to comfortably perform the confirmation of the surrounding environment or the operation (dynamic situation). Due to this, even if the passenger has performed the change operation of the movement trajectory, the passenger is unable to change the movement trajectory as desired, resulting in an unnatural trajectory.

In consideration of the above-described circumstances, the object to be achieved by the present invention is to provide a movement trajectory generator that can appropriately change a movement trajectory of a vehicle according to an operation of a passenger.

Solution to Problem

A movement trajectory generator that generates a movement trajectory of a vehicle according to one aspect of the invention may include traveling environment recognition means for recognizing a traveling environment; movement strategy generation means for generating movement strategies for positioning in a road area according to the traveling environment that is recognized by the traveling environment recognition means; presenting means for presenting a passenger with setting information of the movement strategies; setting means for receiving an operation for the passenger to set the movement strategies based on the setting information of the movement strategies presented by the presenting means; and movement trajectory generation means for generating the movement trajectory based on the movement strategies set by the setting means.

In this movement trajectory generator, the traveling environment recognition means recognizes a surrounding traveling environment of a vehicle. In the movement trajectory generator, the movement strategy generation means generates movement strategies according to the result of recognition of the traveling environment. The movement strategies, which are higher concept of the movement trajectory, are information that becomes a base (basic policy) for generating the movement trajectory, and particularly, relate to positioning within a vehicle road area (positioning in the vehicle traveling direction, positioning in the road width direction, and the like). Accordingly, since the movement strategies, in the same manner as the movement trajectory, do not represent an accurate trajectory when a vehicle travels, a passenger can intuitively or promptly set the movement strategies. Further, in the movement trajectory generator, the presenting means presents information for a passenger to set the movement strategies to the passenger. If the information for setting the movement strategies is presented, the passenger, who desires to correct the movement strategies generated on the apparatus side, sets the movement strategies (the set movement strategies are different from the movement strategies generated on the apparatus side) through the setting means. In the movement trajectory generator, according to the passenger's setting of the movement strategies, the movement trajectory generation means generates the movement trajectory based on the movement strategies set by the passenger. The generated movement trajectory is according to the positioning policy in the road area of the passenger, and becomes the movement trajectory that is desired by the passenger. In the movement trajectory generator as described above, since the movement strategies can be set by the passenger through presenting of the setting information of the movement strategies which are higher concept of the movement trajectory, appropriate movement strategies can be generated according to the setting operation of the movement strategies set by the passenger. At this time, since the passenger can perform the setting operation of the movement strategies simply (fine adjustment or the like is not necessary) and promptly, it is possible to change the movement trajectory as desired even in the dynamic situation.

In the movement trajectory generator according to one aspect of the invention, the presenting means may present a plurality of movement strategy candidates, and the setting means may receive a passenger's operation of selecting one of the plurality of movement strategy candidates.

In this movement trajectory generator, the presenting means presents a plurality of movement strategy candidates in order for the passenger to set the movement strategies. If the plurality of movement strategy candidates is presented, the passenger, who desires to correct the movement trajectory that is generated on the apparatus side, selects one movement strategy candidate among the plurality of movement strategy candidates through the setting means. As described above, since the movement trajectory generator presents the plurality of movement strategy candidates and receives the selection operation as the setting operation performed by the passenger, the passenger can simply select (set) the movement strategies.

It is preferable that the movement trajectory generator according to one aspect of the invention further includes degree of risk acquisition means for acquiring a degree of risk according to the movement strategy candidates, wherein the presenting means presents the plurality of movement strategy candidates together with the degree of risk acquired by the degree of risk acquisition means.

In this movement trajectory generator, the degree of risk acquisition means acquires the degree of risk according to the movement strategies, and the presenting means presents the plurality of movement strategy candidates with the degree of risk. As described above, since the movement trajectory generator presents the plurality of movement strategy candidates with the degree of risk, the passenger can select an appropriate movement strategy candidate in consideration of the degree of risk. In this case, safety may be in replacement of the degree of risk.

In the movement trajectory generator according to one aspect of the invention, the setting means may be configured to receive a passenger's correction operation of the movement strategies.

If correction-free movement strategies are presented for the passenger to set the movement strategies, the passenger, who desires to correct the movement trajectory that is generated on the apparatus side, performs the operation for correcting the movement strategies through the setting means. As described above, since the movement trajectory generator receives the correction operation of the movement strategies as the setting operation performed by the passenger, the passenger can freely correct the movement strategies, and thus the degree of freedom of the movement strategies is heightened.

It is preferable that the movement trajectory generator according to one aspect of the invention may further include degree of risk acquisition means for acquiring a degree of risk according to the movement strategies, wherein the setting means changes the ease of correction of the movement strategies according to the degree of risk acquired by the degree of risk acquisition means.

In this movement trajectory generator, the degree of risk acquisition means acquires the degree of risk according to the movement strategies. Further, when the passenger performs an operation for correcting the movement strategies through the setting means, if the degree of risk of the movement strategies that the passenger intends to correct is high, the setting means makes the correction operation difficult to be performed, while if the degree of risk of the movement strategies is low, the setting means makes the correction operation easy to be performed. As described above, since the movement trajectory generator changes the ease of the correction operation according to the degree of risk of the movement strategies, setting of the movement strategies caused by the passenger's misdetermination or miscorrection can be suppressed.

The movement trajectory generator according to one aspect of the invention may further include detection means for detecting a passenger's observation area, wherein the presenting means presents the setting information of the movement strategies in the observation area detected by the detection means.

In this movement trajectory generator, the detection means detects the passenger's observation area (area that the passenger observes), and the presenting means presents only the setting information of the movement strategies in the passenger's observation area. As described above, since the movement trajectory generator presents only the setting information of the movement strategies of the passenger's observation area, it becomes possible to set the movement strategies (further to change the movement strategies) only with respect to the area desired by the passenger.

In the movement trajectory generator according to one aspect of the invention, the presenting means may present a factor for setting the movement strategies.

In this movement trajectory generator, the presenting means also presents the passenger with the factor for setting the movement strategies that are determined (recognized) on the apparatus side together with the setting information of the movement strategies. The factor for setting the movement strategies may be, for example, overtaking of a front parked vehicle, pedestrian detour, or the like. If the factor for setting the movement strategies is presented, the passenger can grasp the intention of the movement strategies (movement trajectory) on the apparatus side based on the factor and can determine whether or not the change of the movement strategies (further, movement trajectory) is necessary. At this time, the factor, which is unable to be determined on the apparatus side may be determined through the recognition of the surrounding environment on the passenger side. As described above, in the movement trajectory generator, by presenting the passenger even with the factor for setting the movement strategies, the passenger can determine more accurately whether or not the change of the movement strategies (movement trajectory) is necessary and if necessary, how much change is necessary.

In the movement trajectory generator according to one aspect of the invention, the traveling environment recognition means may recognize a state of surrounding objects, and the presenting means may also present the state of the surrounding objects recognized by the traveling environment recognition means.

In this movement trajectory generator, the traveling environment recognition means recognizes the state of the surrounding objects, and the presenting means presents the passenger even with the recognized state of the surrounding objects together with the setting information of the movement strategies. Examples of the surrounding objects may include, for example, other vehicles, bicycles, motorcycles, persons, and the like. The state of the surrounding objects may be a stop state, a moving state (traveling state), a crossing state, a moving direction, a moving speed, or unknown. If the state of the surrounding objects is presented, the passenger can determine whether or not the change of the movement strategies (further, movement trajectory) is necessary based on the state of the surrounding objects. At this time, the state of the objects, which is unable to be recognized on the apparatus side may be determined through the recognition of the surrounding environment on the passenger side. As described above, in the movement trajectory generator, by presenting the passenger even, with the state of the surrounding objects, the passenger can determine more accurately whether or not the change of the movement strategies (movement trajectory) is necessary.

Advantageous Effects of Invention

According to the present invention, since the setting information of the movement strategies, which are a higher concept of the movement trajectory, is presented and the passenger can set the movement strategies accordingly, the movement trajectory can be appropriately changed according to a passenger's simple setting operation of the movement strategies.

BRIEF DESCRIPTION OF DRAWINGS

FIG. 5 is an explanatory diagram of deviance from rules, in which (a) shows an example of a rule list that indicates costs in the case of violation of rules, (b) shows an example of whether to comply with the rules in the case of traveling between nodes 1 and 2 of FIG. 4, and (c) shows an example of whether to comply with the rules in the case of traveling between nodes 1 and 3 of FIG. 4.

FIG. 8 is a diagram illustrating a display example of movement strategy candidates by a selection method.

FIG. 9 is a diagram illustrating a display example of movement strategy candidates (including degree of risks) by a selection method.

DESCRIPTION OF EMBODIMENTS

Hereinafter, a movement trajectory generator according to an embodiment of the invention will be described with reference to the accompanying drawings.

In this embodiment, the movement trajectory generator according to the present invention is applied to a movement trajectory generator that is mounted on an automatic motorcar. The movement trajectory generator according to this embodiment generates the movement trajectory that is used in automated driving, and provides the generated movement trajectory to an automated driving control device. The movement trajectory generator according to this embodiment performs a screen display of presentation to passengers using a display having a touch panel function, and receives the passenger's operation as a touch, operation of the display.

Figure 1:
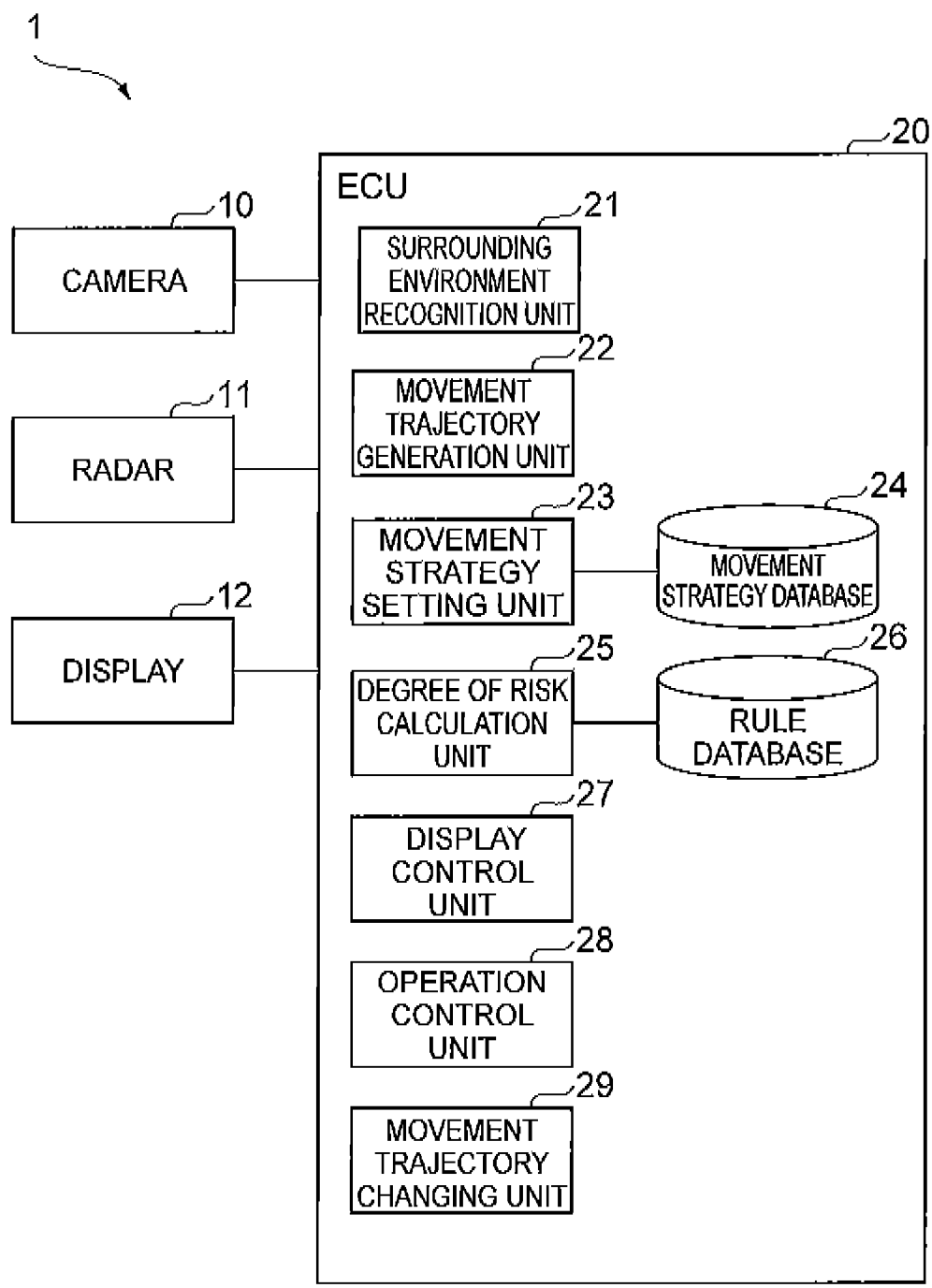
FIG. 1 is a diagram illustrating the configuration of a movement trajectory generator according to an embodiment of the invention.

Referring to FIG. 1, the movement trajectory generator 1 according to an embodiment of the invention will be described. FIG. 1 is a diagram illustrating the configuration of a movement trajectory generator according to an embodiment of the invention.

The movement trajectory generator 1 determines a traveling scene (situation) on the apparatus side, and automatically generates movement trajectory based on movement strategies according to the traveling scene. Particularly, in order to make it possible to correct the movement trajectory that is generated on the apparatus side, the movement trajectory generator 1 receives a passenger's change operation of the movement strategies, and if the movement strategies have been changed, it regenerates the movement trajectory based on the movement strategies. Because of this, the movement trajectory generator 1 includes a camera 10, a radar 11, a display 12, and an ECU (Electronic Control Unit) 20, and the ECU 20 is provided with a surrounding environment recognition unit 21, a movement trajectory generation unit 22, a movement strategy setting unit 23, a movement strategy database 24, a degree of risk calculation unit 25, a rule database 26, a display control unit 27, an operation control unit 28, and a movement trajectory changing unit 29.

In this embodiment, the movement trajectory generation unit 22 corresponds to movement strategy generation means according to an aspect of the invention, the camera 10, the radar 11, and the surrounding environment recognition unit 21 correspond to traveling environment recognition means according to an aspect of the invention, and the display 12, the movement strategy setting unit 23, and the display control unit 27 correspond to presenting means according to an aspect of the invention. Further, the display 12 (particularly, touch panel function) and the operation control unit 28 correspond to the setting means according to an aspect of the invention, the degree of risk calculation unit 25 corresponds to degree of risk acquisition means according to an aspect of the invention, and the movement trajectory changing unit 29 corresponds to movement trajectory generation means according to an aspect of the invention.

The camera 10 is a camera that photographs the surrounding (at least the front, and if necessary, the side and the rear) of the host vehicle. The camera 10 may be, for example, a visible camera, an infrared camera, or a spectrum camera. The camera 10 photographs the surrounding of the host vehicle and transmits the photographed image information to the ECU 20 as an image signal.

The radar 11 is a radar that detects an object in the surrounding (at least the front, and if necessary, the side and the rear) of the host vehicle. The radar 11 may be, for example, a laser radar, a millimeter-wave radar, or an ultrasonic radar. The radar 11 scans and transmits an electromagnetic wave in a horizontal plane, receives a reflected wave that is reflected by an object and returns, and detects information on the transmission and reception, of the electromagnetic wave. Further, the radar 11 transmits the detected transmission/reception information to the ECU 20 as a radar signal.

The display 12 is a display that is mounted on a vehicle that is commonly used with a navigation system. If a display signal is received from the ECU 20, the display 12 displays an image based on the display signal. Further, the display 12 is provided with a touch panel function, and receives a passenger's touch operation on a display screen. If the passenger touches the screen, the display 12 transmits the position information on the screen to the ECU 20 as a touch operation signal. Further, if a touch control signal is received from the ECU 20, the display 12, in the case where the passenger intends to touch and move on the screen, provides an operation resistance with respect to the movement operation according to the operation resistance that is shown in the touch operation control signal.

The ECU 20 is an electronic control unit that is composed of a CPU (Central Processing Unit), a ROM (Read Only Memory), a RAM (Random Access Memory), and the like, and collectively controls the movement trajectory generator 1. In the ECU 20, a surrounding environment recognition unit 21, a movement trajectory generation unit 22, a movement strategy setting unit 23, a degree of risk calculation unit 25, a display control unit 27, an operation control unit 28, and a movement trajectory changing unit 29 are configured as application programs that are stored in the ROM are loaded in the RAM and executed by the CPU. Further, in the ECU 20, a movement strategy database 24 that is a specific area of a storage device and a rule database 26 are constructed. The ECU 20 receives the image signal from the camera 10 or the radar signal from the radar 11 at regular intervals, and if the passenger performs a touch operation on the display 12, it receives the touch operation signal from the display 12. Further, the ECU 20 performs processes in the respective units 21, 22, 23, 25, 27, 28, and 29, and in the case of displaying various kinds of information on the display 12, it transmits a display signal to the display 12.

Figure 3:
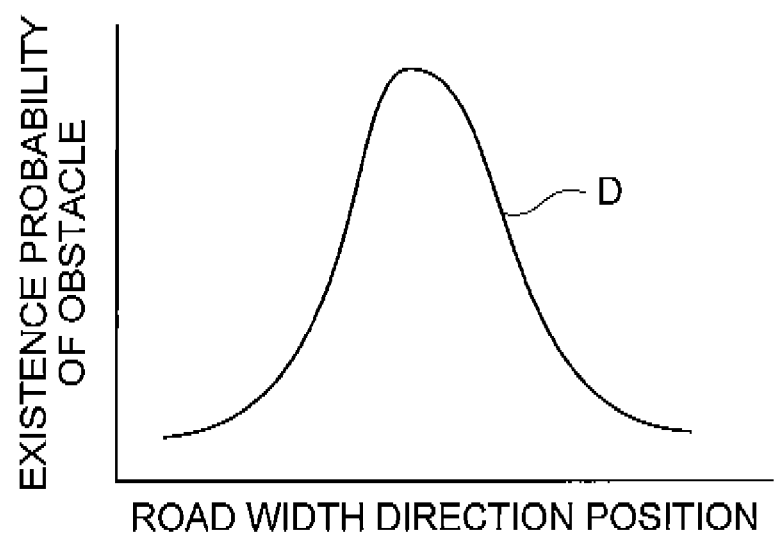
FIG. 3 is a graph showing the existence probability of obstacles in a road width direction position.

The surrounding environment recognition unit 21 recognizes surrounding objects of the host vehicle based on the photographed image from the camera 10 and the transmission/reception information from the radar 11. Particularly, the surrounding environment recognition unit 21 recognizes attributes of the recognized objects (vehicles, persons (as more detailed attributes, adults, children, old persons, and the like), dogs, cats, bicycles, motorcycles, objects related to construction, falling objects on a road, signs, road marking, traffic signals, and the like). Further, the surrounding environment recognition unit 21 recognizes the states of the recognized objects (a position, a stop state (particularly, parking state), a moving state (particularly, traveling state), a crossing state, a moving speed, a moving direction, or unknown). Further, with respect to the object (obstacle) existing in the traveling direction of the host vehicle, the surrounding environment recognition unit 21 calculates the existence probability of the object for the position of the host vehicle in the road width direction. FIG. 3 shows an example of distribution D that indicates the existence probability of an obstacle for the position in the road width direction. Further, the surrounding environment recognition unit 21 recognizes the conditions (a nile, a manner, and the like) that prescribe the movement of the vehicle. The rule is a general traffic rule that is prescribed in a sign or the like. For example, in the case of a signal or a display, the rule may be the contents thereof (no entry, no right turn, no left turn, speed limit, no protrusion out of a yellow line, and the like), while in the case of a traffic signal, it may be a signal color or a travelable direction. The manner is a general traffic manner, and may be, for example, a speed reduction when passing the side of a pedestrian. In, this case, the recognition method or the method of calculating the existence probability in the related art may be adopted.

Further, the surrounding environment recognition unit 21 determines the traveling scene (situation) based on the result of recognizing the surrounding objects. Particularly, in the case where the recognizable object is an object that may be an obstacle to the traveling of the host vehicle, the surrounding environment recognition unit 21 determines the traveling scene from the position relationship between the object and the host vehicle. The traveling scene may be a typical traveling state, being stagnant, a slow vehicle ahead, a pedestrian crossing ahead (existence or nonexistence of crossing persons), a red signal ahead, a street-parking vehicle, a pedestrian on the street, a bicycle on the street, a falling object on the street, during road construction, or the like.

Figure 2:
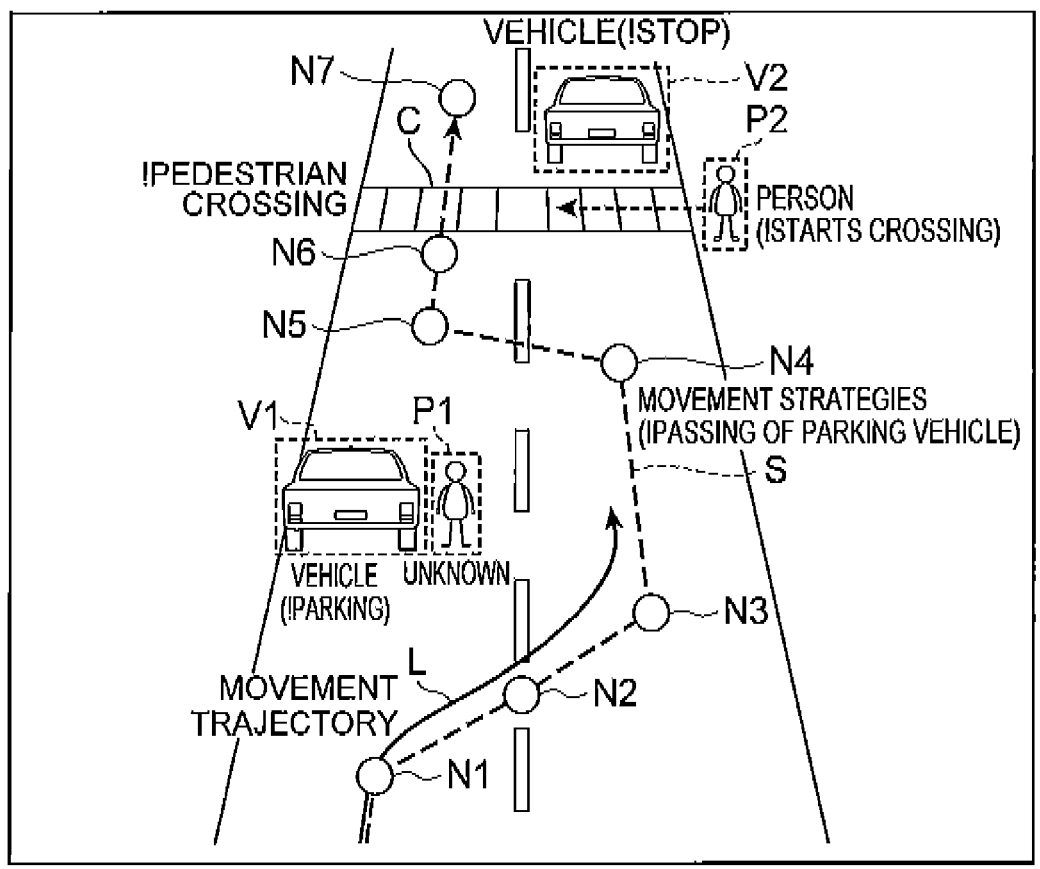
FIG. 2 is a diagram illustrating a display example of the results of recognizing a movement trajectory, movement strategies, and surrounding environment.

For example, in the case of an example illustrated in FIG. 2, a vehicle V1 stops (is parked) in front of the host vehicle on the traveling lane, and the surrounding environment recognition unit 21 recognizes the vehicle V1 as an attribute "vehicle" and recognizes "parked vehicle" as a state. Further, a person P1 is present on the side of the vehicle V1, and the surrounding environment recognition unit 21 can recognize the person P1 as an object, but is unable to recognize the attribute or the state to set "unknown". In this case, since the surrounding environment recognition unit 21 recognizes that the parked vehicle is present in front of the host vehicle, the surrounding environment recognition unit 21 determines a street-parking vehicle ahead as the traveling scene. Further, a pedestrian crossing C exists in front, and the surrounding environment recognition unit 21 recognizes the pedestrian crossing C as an attribute "pedestrian crossing". Further, a person P2 who intends to go through the pedestrian crossing C is present and thus the surrounding environment recognition unit 21 recognizes the person P2 as the attribute "person", and recognizes "crossing start" as the state. Further, in the opposite lane, a vehicle V2 stops in front of the pedestrian crossing C, and the surrounding environment recognition unit 21 recognizes the vehicle V2 as the attribute "vehicle" and recognizes "stopped vehicle" as the state.

The movement trajectory generation unit 22 sets the movement strategies according to the result (particularly, traveling scene) of recognizing the surrounding environment through the surrounding environment recognition unit 21, and automatically generates the movement trajectory based on the movement strategies. Here, whenever the traveling scene that is determined by the surrounding environment recognition unit 21 is changed, the movement strategies of a preset standard is set according to the traveling scene. Further, based on the movement strategies, the movement trajectory, of which the position, moving direction, and moving speed are prescribed per unit time or unit distance when the vehicle travels.

The movement strategies, which are higher concept of the movement trajectory, is information that becomes a base (basic policy) for generating the movement trajectory. The movement strategies may be movement strategies for traveling straight, movement strategies for turning right, movement strategies for turning left, movement strategies for stopping in front of a red signal or pedestrian crossing, movement strategies for changing lanes, movement strategies for overtaking a parked vehicle, or movement strategies for going around a pedestrian or a bicycle. The movement strategies for stopping are movement strategies for positioning in the vehicle traveling direction. The movement strategies for changing lanes, overtaking a parked vehicle, and going around a pedestrian are movement strategies for positioning in the road width direction. Accordingly, the positioning in a road area includes at least positioning (going straight or stopping) in the vehicle traveling direction and positioning in the road width direction.

Whenever the surrounding environment recognition unit 21 determines the traveling scene, the movement strategy setting unit 23 sets movement strategy candidates for the passenger to change the movement strategies. For example, in the case of an example illustrated in FIG. 2, a movement strategy candidate that goes around a parked vehicle V1, a movement strategy candidate that stops in front of a parked vehicle V1, a movement strategy candidate that goes straight and stops in front of a pedestrian crossing C, and a movement strategy candidate that goes straight up to the end of the pedestrian crossing C may be set. Further, in the case of the movement strategies for going around a parked vehicle V1, plural candidates, which have changed the detouring amounts in the road width direction, may be set.

Whenever the movement strategies are changed by the passenger, the movement strategy setting unit 23 stores the changed movement strategies and the corresponding traveling scene at that time in the movement strategy database 24. Accordingly, in the movement strategy database 24, the movement strategies set by the passenger for each traveling scene are stored. Accordingly, the movement strategy setting unit 23 searches the movement strategy database 24 with the traveling scene that is determined by the surrounding environment recognition unit 21 as a key, and extracts the movement strategies that corresponds to the traveling scene. Further, the movement strategy setting unit 23 sets the extracted movement strategies at high priority as the movement strategy candidate.

The degree of risk calculation unit 25 sets the degree of risk based on the collision probability of the obstacle and the deviance from the traffic rule for each movement strategy candidate that is set according to the traveling scene. Here, the existence probability of an obstacle that is calculated by the surrounding environment recognition unit 21 and a rule list that is stored in the rule database 26 are used.

Specifically, the degree of risk calculation unit 25 calculates the collision probability with obstacles in the case where the host vehicle travels in the respective directions according to the movement strategy candidate based on the existence probability of the respective obstacles. In the case of an example illustrated in FIG. 4, the host vehicle exists at node N1, and in the case of one movement strategy candidate, the host vehicle goes straight from the node N1 and reaches a node N2, while in the case of the other movement strategy candidate, the host vehicle goes around from node N1 to node N3 and reaches the node N2. Two obstacles exist between node N1 and node N2, and the existence probability of 0.5 is obtained from the existence probability distribution D1 with respect to the first obstacle, while the existence probability of 0.3 is obtained from the existence probability distribution D2 with respect to the second obstacle. Accordingly, the collision probability of 0.8 (=0.5+0.3) is calculated. One obstacle exists between node N1 and node N3, and the existence probability of 0.4 is obtained from the existence probability distribution D3 with respect to the obstacle. Accordingly, the collision probability becomes 0.4. As the collision probability value becomes larger, the collision probability with the obstacle becomes higher, and thus the degree of risk is heightened.

Further, the degree of risk calculation unit 25 calculates the deviance from the rules in the case where the host vehicle travels in the respective directions according to the movement strategy candidate based on a rule list. FIG. 5(a) illustrates an example of a rule list, and costs (as the cost value becomes larger, the degree of risk is heightened) in the case of violation of traffic rules are correspondingly stated in the rule list. In the case of applying the rule list of FIG. 5(a) to the example illustrated in FIG. 4, the deviance from rules is calculated as follows. In the case of one movement strategy candidate, rule 1 and rule 3 exist between node N1 and node N2, and in the case where the host vehicle travels, the rule 1 can be observed, but the probability that the rule 3 can be observed is about 50%. Accordingly, the deviance from the rule is calculated as 1.0×0+0.4×0.5=0.2. In the case of the other movement strategy candidate, rule 1 and rule N exist between, node N1 and node N3, and in the case where the host vehicle travels, neither of the rule 1 and the rule N can be observed, and thus the deviance from the rule is calculated as 1.0×1+0.8×1=1.8. As the deviance value becomes larger, the degree of risk becomes higher.

Figure 4:
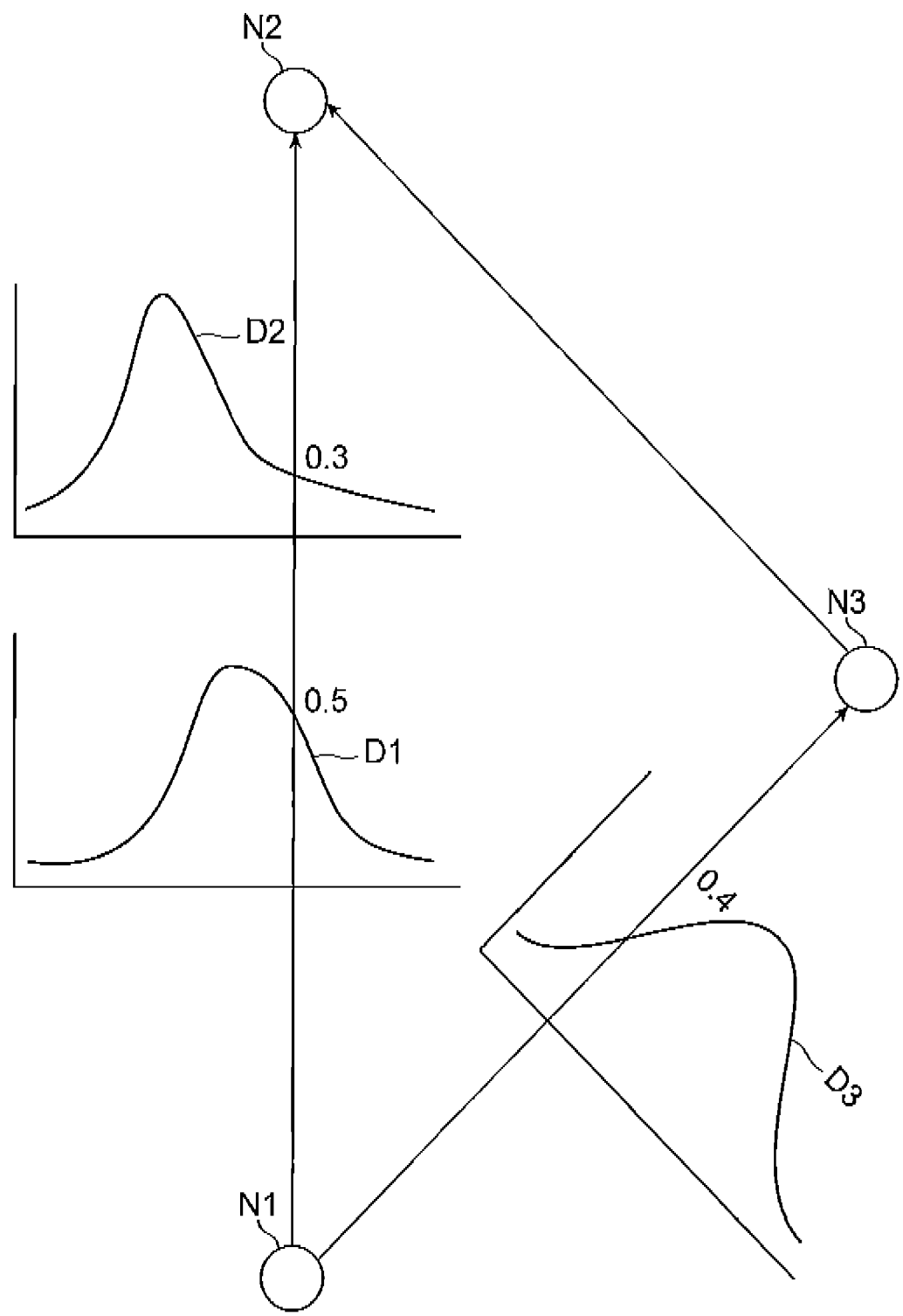
FIG. 4 is a diagram illustrating an application example of the existence probability of obstacles with respect to a road width direction position between nodes.
Figure 6:
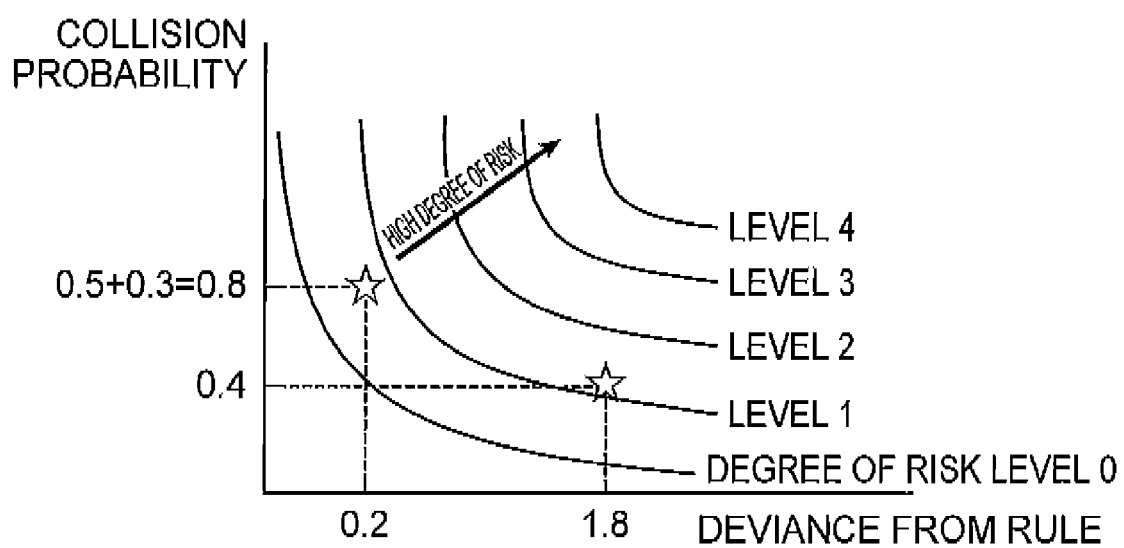
FIG. 6 is a diagram illustrating an example of a degree of risk map that indicates degree of risk levels with deviance from rules and collision probability as parameters.

Further, the degree of risk calculation unit 25 sets a degree of risk level that corresponds to the collision probability and the deviance from the rule with reference to a degree of risk map. FIG. 6 shows an example of a degree of risk map, in which degree of risk levels 0 to 4 are set with the deviance from the rule and the collision probability as parameters, and as the value of the collision probability becomes larger, the corresponding degree of risk level becomes higher. In the case of an example as illustrated in FIGS. 4 and 5, the degree of risk levels are set as follows. In the case of one movement strategy candidate, the collision probability between node N1 and node N2 is 0.8 and the deviance from the rule is 0.2, and thus the degree of risk level of 0.5 is set from the degree of risk map. In the case of another movement strategy candidate, the collision probability between node N1 and node N3 is 0.4 and the deviance from the rule is 1.8, and thus the degree of risk level of 1 is set from the degree of risk map. Accordingly, in this example, the movement strategies for going around from node 1 to node 3 have a higher degree of risk.

In order to present the passenger with the recognition result of the surrounding environment recognition unit 21, the movement trajectory generated by the movement trajectory generation unit 22, and the movement strategy candidate set by the movement strategy setting unit 23, the display control unit 27 generates an image for displaying the information, and transmits the display signal composed of the image information to the display 12. Further, in the case where the movement trajectory changing unit 29 changes the movement trajectory, the display control unit 27 generates an image for displaying the movement trajectory that is changed by the movement trajectory changing unit 29 instead of the movement trajectory that is set by the movement trajectory generation unit 22, and transmits the display signal composed of the image information to the display 12. The basic image may be an image photographed by the camera 10 or may be an image that is obtained by adding the recognized object to an image (CG image) that is generated by a navigation device. Diverse displays, such as plane display, high-angle display, 3D stereoscopic display, can be applied to the image.

The recognition result of the surrounding environment recognition unit 21, as illustrated in FIG. 2, is displayed as an attribute or state of an object with characters or icons with respect to the recognized objects. Particularly, in the case of the moving object, whether or not the object moves, the moving speed, and the moving direction are indicated by arrows or the like. Further, in the case of recognizing a sign or a traffic signal, the rule is displayed with a character or an icon, and if necessary, even a manner is displayed. Further, the traveling scene that is determined with respect to the movement strategies is displayed. Further in the case of a moving object (particularly, in the case where the moving object becomes an obstacle with respect to the host vehicle), highlighting such as surrounding the object with a frame or the like may be performed. In this case, if the attribute or the state is unable to be recognized, "unknown" is displayed with respect to the object.

The movement trajectory set by the movement trajectory generation unit 22 is indicated by a line such as a sign L and an arrow in FIG. 2. At this time, in the case of the movement trajectory such as passing through the near of the "unknown" object, the reliability is low, and highlighting may be made as attention in the sense.

In showing the movement strategy candidates set by the movement strategy setting unit 23, as illustrated in FIG. 2, the movement strategies S that becomes the base are shown with nodes N1, N2, ..., N7 and lines connecting the nodes, and then, as illustrated in FIG. 8, it may be shown which node the movement strategies pass through for each movement strategy candidate. An example as illustrated in FIG. 8 corresponds to the movement strategies for candidate 1 to go straight from node 1 to node 7, the movement strategies for candidate 2 to go straight from node 1 to node 6 and to stop in front of the pedestrian crossing C, the movement strategies for candidate 3 to stop at node 1 that is in front of the parked vehicle V1, and the movement strategies for candidate 4 to go around a parked vehicle V1 that moves from node N1 to node N2 in the road width direction. Further, as illustrated in FIG. 9, the degree of risk may be displayed for each movement strategy candidate. If a plurality of movement strategy candidates are displayed on the display 12 as described above, the passenger can select one movement strategy candidate by performing touch operation on the display 12.

The movement strategy candidate set by the movement strategy setting unit 23, as illustrated in FIG. 10(a), indicates the basic movement strategies S1 with nodes N1, N2, ..., N5 and lines that connect the nodes, and enables the positions of the nodes N1, N2, ..., N5 of the movement strategies S1 to move on the screen. If the movement strategies S1 are displayed on the display 12, the passenger can freely correct the movement strategies by moving the positions of the respective nodes through touch operation on the display 12. For example, in the case of an example as illustrated in FIG. 10(a), since the passenger recognizes the object P1 that is displayed as "unknown," as a person, the passenger considers it is necessary to make the movement trajectory L1 set on the apparatus side further apart from the person P1, and moves node N2 and node N3 to the right. Further, in consideration of a person P2 who intends to cross the pedestrian crossing C, the passenger P2 considers it is necessary to stop the movement trajectory L1 set on the apparatus side in front of the pedestrian crossing C, and moves node N5 up to the front of the pedestrian crossing C. As a result, as illustrated in FIG. 10(b), the movement strategies S2 include movement of the positions of the nodes N2, N3, and N5, and the basic movement trajectory is changed to the movement trajectory S2.

At this time, the relationship between the object that is recognized by the surrounding environment recognition unit 21 and the movement strategies is calculated, and only the object having high relationship is displayed while the object having low relationship is not displayed. Further, a database for storing the movement strategies that are not presented may be obtained, and the movement strategies that are stored in the database may not be displayed. The movement strategies that are not presented are movement strategies such as typical traveling, and, for example, include movement strategies for simply going straight, movement strategies for turning left or right, movement strategies during traveling with low degree of risk (in the case where not obstacle exists or the like), and movement strategies during daytime traveling.

Whenever receiving a touch operation signal from the display 12, the operation control unit 28 recognizes the movement strategy candidate selected by the passenger or the position of the moving node based on the position information on the screen of the display 12, which is shown in the touch operation signal.

Figure 7:
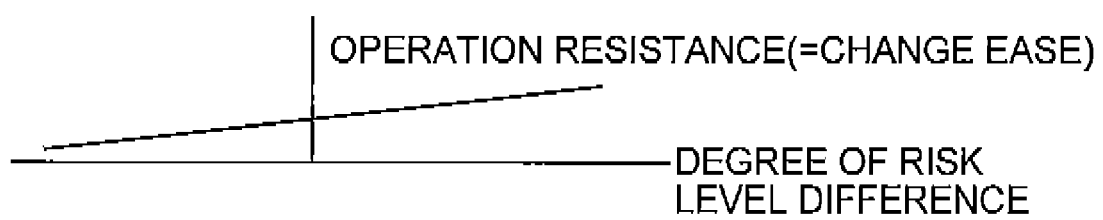
FIG. 7 is a graph illustrating operation resistance for a degree of risk level difference.
Figure 10:
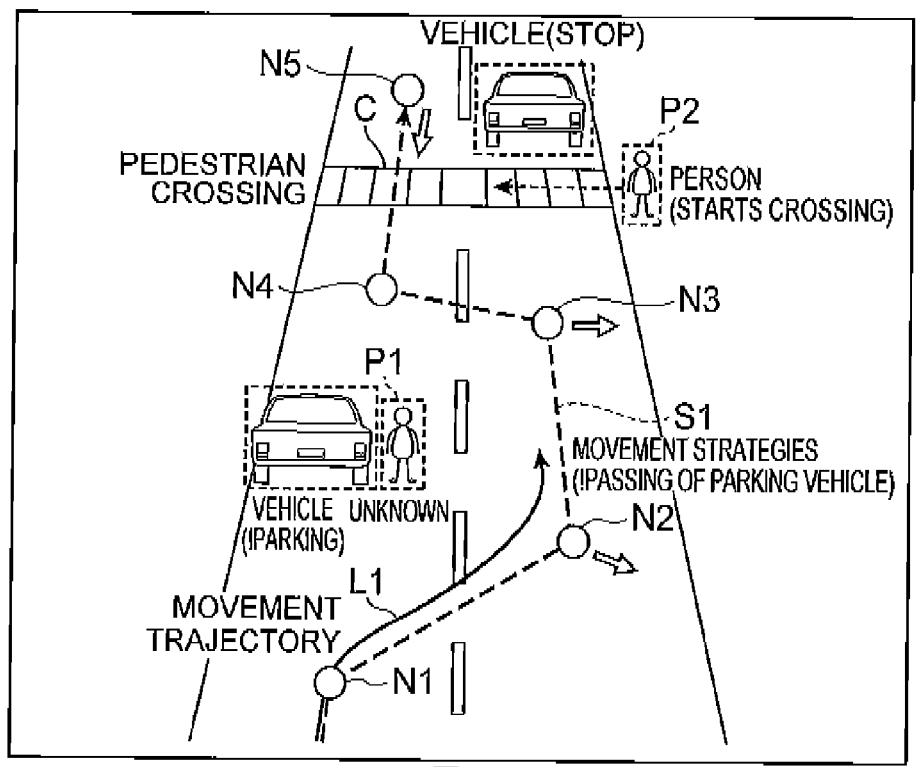
FIG. 10 is a diagram illustrating a display example during and after a correction operation of the movement strategies by a touch panel method.
Figure 10:
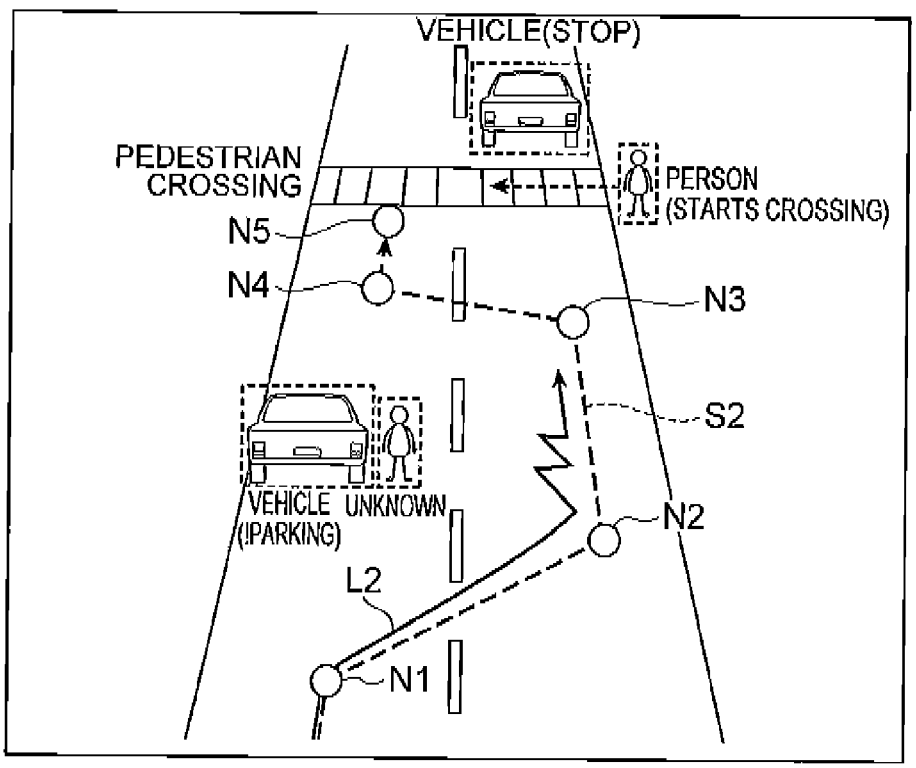

At this time, in the case of a configuration such as selecting of the movement strategies through movement of the positions of nodes as illustrated in FIG. 10, the degree of ease (operation resistance) may be changed when nodes are moved by a touch operation according to the degree of risk for each candidate of the movement strategies. In this case, the operation control unit 28 changes the operation resistance in the case of moving the respective nodes by touch operation according to the degree of risk, and transmits a touch operation control signal for making the operation resistance become higher as the degree of risk becomes higher to the display 12. For example, in the case of the movement strategies for moving nodes N2 and N3 to the left in an example illustrated in FIG. 10, the degree of risk becomes greater, and thus the operation resistance of the nodes N2 and N3 becomes higher. By contrast, in the case of the movement strategies for moving the nodes N2 and N3 to the left to a certain degree, the degree of risk becomes lower, and thus the operation resistance of the nodes N2 and N3 becomes smaller. Further, as illustrated in FIG. 7, by changing the operation resistance according to the difference in level between the degree of risk of the movement strategies currently set and the degree of risk of movement strategies that are changed by the passenger, it is possible to heighten the operation resistance as the level difference becomes greater.

When the movement strategy candidate that is displayed on the display 12 is selected or the position of a node is moved in order to change the movement strategies, the movement trajectory changing unit 29 corrects the movement trajectory that is generated on the apparatus side based on the movement strategies selected (changed) by the passenger, and automatically generates new movement trajectory.

Referring to FIG. 1, the operation of the movement trajectory generator 1 will be described. Here, the operation will be described when the passenger changes the movement strategies (further movement trajectory) in a state where the passenger sets a destination, the movement trajectory generator 1 sequentially generates the movement trajectory for heading the destination, and the vehicle performs automated driving according to the movement trajectory.

The camera 10 photographs the front of the host vehicle at predetermined intervals and transmits an image signal to the ECU 20. The ECU 20 receives the image signal and acquires the photographed image of the camera 10. The radar 11 scans and transmits an electromagnetic wave to the front of the host vehicle in a horizontal plane, receives a reflected wave that is reflected by an object and returns, and transmits the radar signal to the ECU 20. The ECU 20 receives the radar signal and acquires transmission/reception information by the radar 11.

The ECU 20 recognizes respective conditions (a rule, a manner, and the like) that prescribe objects (attribute, state, and the like) surrounding the host vehicle or movement of the objects based on the photographed image of the camera 10 and the transmission/reception information of the radar 11, and determines the traveling scene. Further, whenever the traveling scene is determined, the ECU 20 sets the movement strategies according to the determined traveling scene, and automatically generates the movement trajectory based on the movement strategies.

Further, whenever the traveling scene is determined, the ECU 20 sets a movement strategy candidate. Further, the ECU 20 sets the degree of risk based on the collision probability of an obstacle and the deviance from the traffic rule for each movement strategy candidate. The ECU 20 generates an image for displaying the movement strategy candidate, the degree of risk, the movement trajectory set on the apparatus side, recognized information of the respective objects, or traveling scene, and transmits a display signal to the display 12. If the display signal is received, the display 12 displays an image that indicates a movement strategy candidate, movement trajectory, recognized information of the respective objects, or traveling scene on the basic image based on the display signal.

The passenger confirms the information of the respective objects or the traveling scene displayed on the display 12 and confirms actual surrounding situations through visual recognition. Further, the passenger determines whether or not it is necessary to change the movement trajectory that is generated on the apparatus side in consideration of the result of confirmation or the preference when the passenger drives the vehicle. If, it is determined it is necessary to change the movement trajectory, the passenger selects one movement strategy candidate (or moves the node) by a touch operation on the screen of the display 12.

According to the passenger's touch operation, the display 12 transmits the position information on the screen to the ECU 20 as a touch operation signal. If this touch operation signal is received, the ECU 20 recognizes the movement strategy candidate selected by the passenger based on the position information on the screen of the display 12. Further, the ECU 20 automatically changes the movement trajectory based on the movement strategies selected by the passenger.

According to this movement trajectory generator 1, since the passenger can select the movement strategy candidate or correct the movement strategies by presenting the movement strategy candidate that is higher concept of the movement trajectory or movement strategies of which correction is free, it is possible to change to an appropriate movement trajectory according to the passenger's change operation of the movement strategies. At this time, since the passenger can simply and promptly perform the change operation of the movement strategies, it is possible to change to a desired movement even in a dynamic situation. Accordingly, the driving load can be greatly reduced. Further, even in the case of generating the movement trajectory having low reliability on the apparatus side, the passenger can change to appropriate movement strategies (further, movement trajectory). Further, in the case of selecting and changing the movement strategy candidate, the passenger can simply change the movement strategies. Further, in the case of correcting and changing the movement strategies, the degree of freedom for the change of the movement strategies is heightened.

Further, according to the movement trajectory generator 1, the degree of risk of each movement strategy candidate is presented, and thus the passenger can select appropriate movement strategies in consideration of the degree of risk. Further, according to the movement trajectory generator 1, by changing the ease of the correction operation according to the degree of risk of the respective movement strategy candidates, the change of the movement strategies due to the passenger's misdetermination or miscorrection can be suppressed, and the passenger can change to appropriate movement strategies in consideration of the degree of risk.

Further, according to the movement trajectory generator 1, a set of the passenger's selection of the movement strategies in the past and the traveling scene at that time is stored in the database, and by presenting the passenger with the movement strategies selected in the past with higher priority using the database, the movement strategies that meets with the passenger's taste can be presented, and thus discomfort is not provided to the passenger.

Further, according to the movement trajectory generator 1, by presenting the passenger even with information of the traveling scene or the recognized object, the passenger can determine more accurately whether or not the movement trajectory generated on the apparatus side is appropriate, whether the change of the movement strategies is necessary, and if necessary, how much change is necessary.

Although embodiments of the invention have been described, the present invention is not limited to the above-described embodiments, and is executed in diverse ways.

For example, in this embodiment, although the present invention is applied to an automated driving car, it may be applied to a vehicle on which a drive support device using the movement trajectory is mounted. Further, in the case of using the apparatus in development of a system, the direction of solving the problem regarding the recognition of the surrounding environment, and generation of the movement strategies or movement trajectory can be investigated in real time.

Further, in this embodiment, although the passenger changes the movement strategies by a touch operation of the display having a touch panel function, it is also possible to change the movement strategies by other operations, such as joystick operation, handle operation, button operation, voice input operation, and the like.

Further, in this embodiment, although the surrounding environment is recognized using the information detected by the camera and the radar, other means may be used.

Further, in this embodiment, although the degree of risk is obtained, and the degree of risk is displayed together with the movement strategy candidate or the operation resistance of the change operation is changed according to the degree of risk through the operation control unit, the processing according to the degree of risk may not be performed.

Further, in this embodiment, the surrounding environment is recognized, and the object attribute, state, rule or manner, traveling scene, and the like, are displayed on the display as the recognition result of the surrounding environment in addition to the movement trajectory and the movement strategy candidate. However, only some information among the recognition results of the surrounding environment may be displayed or information except for them may be displayed. Further, information may be provide by other means, such as overlapping display in a front window, sound output, light irradiation, the sense of touch, and the like, rather than the display.

Further, in this embodiment, a movement strategy database for storing the movement strategies selected by the passenger in the past and the traveling scene at that time is provided, and when the movement strategies are presented, the movement strategies are presented in consideration of the passenger's taste selected in the past. However, in order to reduce the processing load or storage capacity, the movement strategy database may not be provided and the passenger's taste may not be considered.

Further in this embodiment, if the object attribute or state is unknown as the result of recognizing the surrounding environment, "unknown" is displayed. However, the passenger may input an accurate attribute or state with respect to the unknown object. Further, the level of the object recognition process may be improved through learning on the apparatus side using the information input by the passenger.

Further, the reliability is obtained with respect to each movement strategy candidate, and high or low reliability of the movement strategy candidate may be presented to the passenger, or the ease of the operation may be changed according to the reliability. For example, if the reliability of the recognition result of the surrounding environment is high, the reliability of the movement strategy candidate according to the recognition result is also heightened, while if the reliability of the recognition result of the surrounding environment is low (in the case where the object attribute or state is unknown), the reliability of the movement strategy candidate according to the recognition result is also lowered. Further, the reliability is obtained with respect to the movement trajectory that is set on the apparatus side, and high or low reliability of the movement trajectory may be presented to the passenger, or the ease of the operation may be changed according to the reliability.

Further, the passenger's observation area is recognized (for example, the passenger's face is photographed by the camera, and the passenger's face direction or the ling of sight is recognized from the photographed image), and only the movement strategies are displayed (presented) in the observation area, or only the movement strategies in the observation area may be changed through a joystick, a handle, or voice input.

Further, if the movement trajectory or movement strategies presented on the apparatus side are greatly wrong, a user interface (button operation or the like) that can promptly perform an emergency stop may be provided.

INDUSTRIAL APPLICABILITY

According to the present invention, since the setting information of the movement strategies which are higher concept of the movement trajectory is presented and the passenger can set the movement strategies, the change to an appropriate movement trajectory can, be performed according to a passenger's simple setting operation of the movement strategies.

REFERENCE SIGNS LIST

1: MOVEMENT TRAJECTORY GENERATOR
10: CAMERA
11: RADAR
12: DISPLAY
20: ECU
21: SURROUNDING ENVIRONMENT RECOGNITION UNIT
22: MOVEMENT TRAJECTORY GENERATION UNIT
23: MOVEMENT STRATEGY SETTING UNIT
24: MOVEMENT STRATEGY DATABASE
25: DEGREE OF RISK CALCULATION UNIT
26: RULE DATABASE
27: DISPLAY CONTROL UNIT
28: OPERATION CONTROL UNIT
29: MOVEMENT TRAJECTORY CHANGING UNIT

The invention claimed is:

1. A movement trajectory generator that generates a movement trajectory of a vehicle, comprising:
traveling environment recognition means for recognizing a traveling environment;
movement strategy generation means for generating at least one candidate of movement strategies for positioning in a road area according to the traveling environment that is recognized by the traveling environment recognition means;
presenting means for presenting a passenger with the candidate of the movement strategies, the presenting means presents a plurality of movement strategy candidates;
setting means for receiving an operation for the passenger to set the candidate of the movement strategies presented by the presenting means, the setting means receives a passenger's operation of selecting one of the plurality of movement strategy candidates;
degree of risk acquisition means for acquiring a degree of risk according to the movement strategy candidates, the presenting means presents the plurality of movement strategy candidates together with the degree of risk acquired by the degree of risk acquisition means; and
movement trajectory generation means for generating the movement trajectory based on the movement strategies set by the setting means.

2. The movement trajectory generator according to claim 1, wherein the setting means receives a passenger's correction operation of the movement strategies.

3. The movement trajectory generator according to claim 2, further comprising degree of risk acquisition means for acquiring a degree of risk according to the movement strategies,
wherein the setting means changes an ease of correction of the movement strategies according to the degree of risk acquired by the degree of risk acquisition means.

4. The movement trajectory generator according to claim 1, further comprising detection means for detecting a passenger's observation area,
wherein the presenting means presents a setting information of the movement strategies in the observation area detected by the detection means.

5. The movement trajectory generator according to claim 1, wherein the presenting means presents a factor for setting the movement strategies.

6. The movement trajectory generator according to claim 1, wherein the traveling environment recognition means recognizes a state of surrounding objects, and
the presenting means also presents the state of the surrounding objects recognized by the traveling environment recognition means.

7. The movement trajectory generator according to claim 1, wherein the display presents a factor for setting the movement strategies.

8. The movement trajectory generator according to claim 1, wherein the surrounding environment recognition unit recognizes a state of surrounding objects, and
the display also presents the state of the surrounding objects recognized by the surrounding environment recognition unit.

9. A movement trajectory generator that generates a movement trajectory of a vehicle, comprising:
a surrounding environment recognition unit for recognizing a traveling environment;
a movement strategy setting unit for generating at least one candidate of movement strategies for positioning in a road area according to the traveling environment that is recognized by the surrounding environment recognition unit;
a display for presenting a passenger with the candidate of the movement strategies, the display presents a plurality of movement strategy candidates;
a movement strategy setting unit for receiving an operation for the passenger to set the candidate of the movement strategies presented by the display, the movement strategy setting unit receives a passenger's operation of selecting one of the plurality of movement strategy candidates;
a degree of risk calculation unit for acquiring a degree of risk according to the movement strategy candidates, wherein the display presents the plurality of movement strategy candidates together with the degree of risk acquired by the degree of risk calculation unit; and
the movement trajectory generator generating the movement trajectory based on the movement strategies set by the movement strategy setting.

10. The movement trajectory generator according to claim 9, wherein movement strategy setting unit receives a passenger's correction operation of the movement strategies.

11. The movement trajectory generator according to claim 10, further comprising degree of risk calculation unit for acquiring a degree of risk according to the movement strategies,
wherein the movement strategy setting unit changes an ease of correction of the movement strategies according to the degree of risk acquired by the degree of risk calculation unit.

12. The movement trajectory generator according to claim 9, further comprising a camera for detecting a passenger's observation area, wherein the display presents a setting information of the movement strategies in the observation area detected by the camera.

13. The movement trajectory generator according to claim 9, further comprising a radar for detecting a passenger's observation area,
wherein the display presents the setting information of the movement strategies in the observation area detected by the radar.

* * * * *